United States Patent [19]

Mazzola et al.

[11] Patent Number: 4,515,908
[45] Date of Patent: May 7, 1985

[54] LIQUID FOAMS OF REINFORCED UNSATURATED POLYESTER RESINS AND PROCESS FOR MAKING THE SAME

[75] Inventors: Massimo Mazzola, Segni; Aldo Cipriani, Colleferro, both of Italy

[73] Assignee: Snia Viscosa Societa Nazionale Industria Applicazioni Viscosa S.p.A., Milan, Italy

[21] Appl. No.: 595,743

[22] Filed: Apr. 2, 1984

Related U.S. Application Data

[60] Division of Ser. No. 457,632, Jan. 13, 1983, Pat. No. 4,440,876, which is a continuation-in-part of Ser. No. 145,251, Apr. 30, 1980, abandoned.

[30] Foreign Application Priority Data

Oct. 5, 1979 [IT] Italy .............................. 22578 A/79

[51] Int. Cl.³ .............................................. C08J 9/30
[52] U.S. Cl. ..................... 521/182; 264/45.3; 264/5 D; 521/84.1; 521/92; 521/109.1; 521/123; 521/138
[58] Field of Search ................ 521/84, 92, 109, 123, 521/182, 138; 264/45.3, 5 D

[56] References Cited

U.S. PATENT DOCUMENTS

| | | | |
|---|---|---|---|
| 2,933,689 | 1/1976 | Ray et al. | 521/138 |
| 3,227,665 | 1/1966 | Fourcade et al. | 521/123 |
| 3,362,919 | 1/1968 | Rood | 521/138 |
| 3,882,055 | 5/1975 | Koermer et al. | 521/112 |
| 3,928,254 | 12/1975 | Takayama et al. | 521/138 |
| 3,954,274 | 5/1976 | Graudlie et al. | 521/138 |
| 4,026,828 | 5/1977 | Similey | 521/138 |
| 4,119,583 | 10/1978 | Filip et al. | 521/138 |
| 4,120,923 | 10/1978 | Kloker et al. | 521/138 |
| 4,122,047 | 10/1978 | Filip et al. | 521/138 |
| 4,148,854 | 4/1979 | Cordts et al. | 521/138 |
| 4,440,816 | 4/1984 | Mazzola et al. | 521/123 |

Primary Examiner—Morton Foelak
Attorney, Agent, or Firm—Hubbell, Cohen, Stiefel & Gross

[57] ABSTRACT

The process for obtaining fiber-reinforced foams suitable to be transformed into reinforced solid cellular materials having a density lower than 0.7 kg/l, if inert fillers are not present, and lower than 1 kg/l if inert fillers are present as well, essentially by mechanical incorporation of gas or a mixture of gases into an unsaturated polyester resin containing conventional additives is described. As reinforcing materials synthetic, vegetable or mineral fibers having a maximum length of 3 mm are employed. The mixture of the resin with the fibers, and optionally with the inert fillers, is conveyed by at least one pump to a mechanical foaming device which introduces into the mixture gas in form of small bubbles, homogeneously and uniformly distributed therein.

3 Claims, 1 Drawing Figure

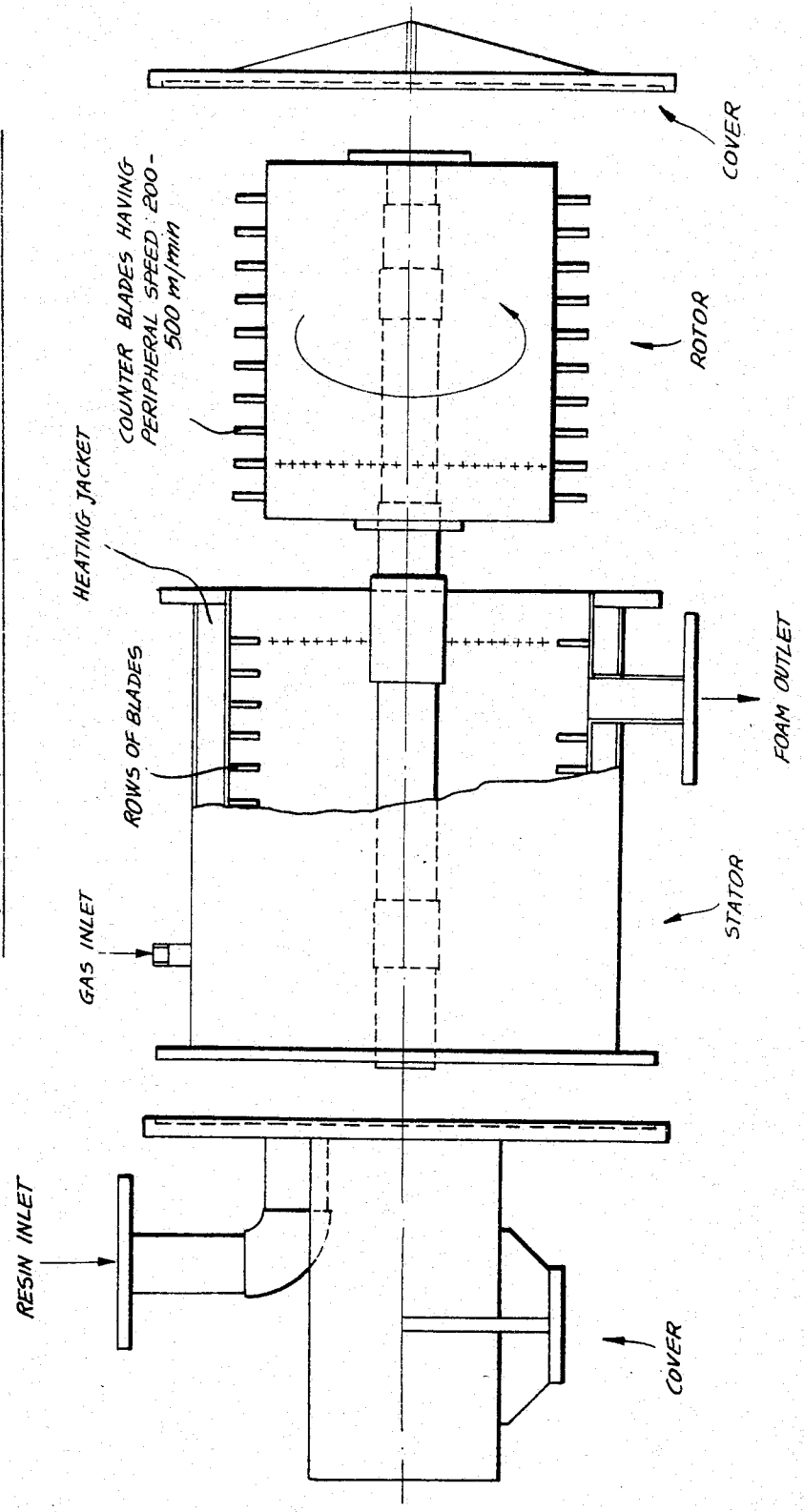

LIQUID FOAMS OF REINFORCED UNSATURATED POLYESTER RESINS AND PROCESS FOR MAKING THE SAME

This is a division of application Ser. No. 457,632, filed Jan. 13, 1983, now U.S. Pat. No. 4,440,876, which is a continuation in part of application Ser. No. 145,251, filed Apr. 30, 1980 now abandoned.

BACKGROUND OF THE INVENTION

The present invention relates to fiber-reinforced liquid foams made from unsaturated polyester resins, suitable to be transformed into reinforced solid cellular materials having a density lower than 0.7 kg/l, if said materials contain reinforcing fibers but not fillers, and lower than 1.0 kg/l, if inert fillers are also present.

The present invention also relates to a process for preparing said liquid foams essentially by mechanical incorporation of a gas or a mixture of gases into an unsaturated polyester resin reinforced with synthetic, vegetable or mineral fibers, containing conventional additives.

Further objects of the present invention will be described hereinafter.

Solutions of unsaturated polyester resins in styrene, reinforced with the reinforcing materials hereinbefore specified, are very difficult to transform into foams, inasmuch as only with difficulty do such solutions retain air or inert gases occluded in a stable and regular manner.

In order to overcome this drawback it has been proposed to employ chemical foaming agents such as e.g. isocyanates, certain azo-compounds, and so forth, which are added to the unsaturated polyester resin at the moment at which the foams are to be formed.

In practice, however, said agents have not yielded satisfactory results, because the copolymerization temperature of the solutions of unsaturated polyester resins in styrene begins to rise very slowly, so that the resin gels a long time before the temperature has become high enough to completely activate the foaming agent.

Further said processes have other disadvantages, such as e.g.:

the chemical agents employed as foaming agents are usually toxic and are generally unstable at room temperature and therefore must be maintained at low temperatures until they are used; and the process is not economical inasmuch as the chemical foaming agent is expensive.

It has also been proposed (U.S. Pat. Nos. 4,120,923 or 3,362,919) to dissolve, under pressure, in the unsaturated polyester resin, gases such as carbon dioxide or air, which, once the pressure is released, for example by means of a nozzle, will cause the resin to foam.

However this type of foaming known as "physical foaming" is not suitable for continuous industrial processes. If reinforcing fibers are present in the resin to be foamed, than the nozzle will become quickly occluded with such fibers and no foam will be produced.

According to another discontinuous method of physical foaming, volatile, low boiling, halogenated hydrocarbons such as $CClF_3$, $CHClF_2$ or $CCl_2F_2$ are dissolved in the resin at a low temperature and foam is produced when the temperature is raised above the boiling point of the hydrocarbon.

The foam eventually produced by these methods has large gas bubbles which are not homogeneously distributed.

SUMMARY OF THE INVENTION

The inventor has now surprisingly found a process whereby it is possible to obtain, essentially by mechanical introduction of gas, a liquid fiber-reinforced unsaturated polyester foam, suitable to be transformed into solid cellular materials reinforced with synthetic, vegetable or mineral fibers having a density lower than 0.7 kg/l, if inert fillers are not present, or a density lower than 1 kg/l when inert fillers are present as well.

An ojbect of the present invention is therefore a continuous process for making liquid fiber-reinforced foams suitable to be transformed into reinforced cellular solid materials having a density lower than 0.7 kg/l in the case of reinforced materials not containing inert fillers or a density lower than 1.0 kg/l if inert fillers are present as well, essentially by mechanical incorporation of a gas or a mixture of gases into an unsaturated polyester resin which contains conventional additives, characterized by the fact that synthetic, vegetable or mineral fibers having a maximum length of 3 mm, and preferably less than 1.5 mm, are used as reinforcing materials, and that the mixture of said resin with said fibers, is conveyed by at least one pump to a mechanical foaming device suitable to introduce gas in the form of small bubbles homogeneously and uniformly distributed in the aforesaid mixture.

Preferably the diameter of the majority of the bubbles does not exceed 0.3 mm.

The percentage of the reinforcing material is suitably maintained between 10 and 30% by weight with respect to the unsaturated polyester resin. Glass fibers having the aforesaid length are preferably employed as reinforcing materials.

DETAILED DESCRIPTION OF THE PREFERRED EMBODIMENTS

When glass fibers are used as reinforcing materials, said fibers have a diameter lower than 16 micron; if synthetic, vegetable or mineral fibers such as e.g. aramide, acrylic, carbon cellulose ester, polyethyleneterephthalate, regenerated cellulose fibers, are employed as reinforcing material, said fibers have a count lower than 20 deniers.

As has already been recognized in the art, the addition to unsaturated polyester resin compositions of inert fillers, such as calcium carbonate, or alumina hydrate in the form of finely divided powders, in an amount up to 40% by weight with respect to the overall weight of the mixture, has the effect of improving some particular properties of the cellular materials, e.g. reduces the product costs, increases the elastic modulus, lowers the shrinkage during cross-linking and may confer to the cellular material self-extinguishing properties.

According to the present invention, a turbine, formed by a stator and a rotor, provided with prismatic or cylindrical projections having a peripheral speed from 200 to 500 m/min is essentially employed as the mechanical foaming device suitable to introduce the gas into the unsaturated additive containing polyester resin.

According to the present invention the apparatus for the production of reinforced foams preferably comprises a stirrer-mixer in which the solution of unsaturated polyester alkyds in styrene containing suitable additives is mixed with the reinforcing fiber material hereinbefore specified (preferably milled glass fibers or chopped strands up to a length of 1.5 mm) and is then introduced through a feed pump into the turbine which has the aforesaid characteristics.

Said turbine is conveniently heated by means of heating jackets provided both on the stator and the rotor of the turbine.

The structure of the turbine preferred for the foaming process according to the present invention is illustrated in the exploded view of the attached figure 1. The dimensions of this turbine may vary in a wide interval depending on the amount of foam which is desired to be produced per unit of time. From the economical point of view, however, it is desirable to select, for industrial uses, turbines having a free internal volume not less than 2–3 liters which are suitable for foaming from 10 to 100 liters/hour of mixture fed (comprising resin, additives, reinforcing fibers and optionally fillers). Within the limits indicated, the amount of foam produced in the turbine will be determined and controlled by the flow rate of the feeding pump. If higher amounts of foam are desired to be produced, it is necessary to use turbines having larger free volumes and therefore capable to foam higher amounts of feed. There are no critical upper limits for the turbine dimensions, except for economical considerations related to the hourly amount of foam which may be consumed in the production of cellular materials.

An example of a turbine suitable for industrial production on small-medium scale has the following dimensions free volume of the turbine = 4 liters
length of the stator = 26.3 cm
diameter of the stator = 10 cm
length of the rotor = 20 cm
position of the projections (pegs) = in alternate rows on the stator and the rotor
foaming capacity = adjustable between 30 and 200 liter/hour of mixture fed.

For industrial production on medium-large scale a turbine can be used which has the following characteristics: (turbine "A")

free volume of the turbine = 14 liters
length of the stator = 41.5 cm
diameter of the stator = 31 cm
length of the rotor = 31.6 cm
position of pegs = in alternative rows on the stator and the rotor
foaming capacity = adjustable between 100 and 800 l/h of mixture fed
density of the foam produced = adjustable by varying the ratio between the amount of mixture fed and the amount of gas introduced per unit of time.

In the examples which will follow illustrating the process of the present invention turbine "A" was employed.

In said turbine a gas (preferably nitrogen or air) which constitutes the foaming element is also introduced under an appropriate pressure of between 1.1 and 10 absolute atmospheres, preferably between 2 and 4 absolute atmospheres. In the last or last but one row of projections of the turbine, where the foam has already been created, the catalyst is introduced so that the foam thus produced is already catalyzed when it flows out of the turbine.

The liquid foams, reinforced with synthetic, vegetable or mineral fibers have a length less than 3 mm, as hereinbefore specified, form a further object of the present invention.

The cross-linking of said foams and thus the shaping of the desired articles, are carried out in conventional devices such as e.g. in open moulds or in continuous shaping devices. The reinforced solid cellular materials, which have preferably more than 80% closed cells, obtained by cross-linking the above specified liquid foams, e.g. in open moulds or in continuous shaping devices, also form an object of the present invention.

The expression "unsaturated polyester resins" is to be construed, according to the present invention, as meaning the resins obtained from an unsaturated polyester alkyd, formed by polycondensation of at least one -$\alpha$-$\beta$-ethylenically unsaturated dicarboxylic acid and/or its anhydride with at least one polyvalent alcohol and by dissolving the thus obtained unsaturated polyester alkyd in one or more ethylenically unsaturated monomers, such as e.g. styrene, $\alpha$-methylstyrene, methyl methacrylate, diallylphthalate, vinyl toluene, etc.

Examples of ethylenically unsaturated dicarboxylic acids or the corresponding anhydrides, comprise maleic acid or its anhydride, fumaric, itaconic and mesaconic acids. Together with the unsaturated dicarboxylic acids there may be employed saturated, mono or polyfunctional aliphatic carboxylic acids, such as adipic, succinic, glutaric acid and the like; aromatic, mono or polyfunctional carboxylic acids, such as phthalic, isophthalic, terephthalic, benzoic acid, etc., anhydrides such as phthalic, trimellitic anhydride, etc.

As polyvalent alcohols there may be employed: ethylene glycol, propylene glycol, 1,2-butanediol, diethylene glycol, dipropylene glycol, 1,6-hexanediol, 1,4-cyclohexane methane diol, trimethylol propane, pentaerythrite, glycerine, neopentyl glycol, etc.

The unsaturated polyester resins may be prepared by the known processes used for the polyester resins, both in solvent and in dry phase.

According to a practical and preferred embodiment of the present invention, the unsaturated polyester resin is obtained by reacting from 1 to 1.3 mols of at least one polyvalent alcohol with from 0.05 to 1 mol of at least one ethylenically unsaturated dicarboxylic acid and/or its corresponding anhydride. The polycondensation is continued until a polymer is obtained having an acid number of between 5 and 90 mg of KOH/g. The preferred acid number is of between 10 and 30 mg of KOH/g and the molecular weight between 500 and 5000.

Besides the ethylenically unsaturated dicarboxylic acid and/or anhydride, at least one saturated dicarboxylic acid in an amount comprised between 5 and 95% (molar percentage) with respect to the unsaturated dicarboxylic acid may also be present in the mixture, according to the known art.

The unsaturated polyester thus obtained is mixed with styrene, in a polyester/styrene ratio comprised between 9:1 and 1:1; preferably 4:1 and 2.5:1.

Inhibitors and stabilizers suitable to prevent the premature cross-linking of the mixture may be added to the styrene/unsaturated polyester mixture in amounts from 0.1 ppm to 10,000 ppm.

The most commonly used inhibitors and stabilizers are: hydroquinone, quinone, quinhydrone, tertiarybutylpyrocatechol, toluenehydroquinone, monotertiary butylhydroquinone, ditertiary butylhydroquinone, 1,4-naphthoquinone, anthraquinone, methyl and- /or ethyl esters of hydroquinone, picric acid, trinitrobenzene, paraphenylenediamine, etc.

Further to improve the stability of the resin, organic or inorganic compounds soluble in the polyester, quaternary ammonium salts, etc. are added.

The reinforcing material according to the invention is added to the unsaturated polyester resin thus obtained, and then the whole is mixed with a gas under continuous stirring in the turbine hereinbefore described, wherein a cross-linking catalyst system of a known type is also introduced. A reinforced and homogeneous foam is thus obtained which may be poured into open molds and allowed to stay under atmospheric conditions for a period of time sufficient to obtain the complete cross-linking, whereby a shaped rigid cellular material is formed.

In order to improve the stability of the foam, additives are added to the unsaturated polyester resin before foaming, such as e.g. surface acting agents for promoting the formation of the foam and/or agents for regulating the diameter of the gas bubbles and/or foam stabilizing agents, e.g. surface active agents based on silicone compounds, block copolymers of silicones with polyethers, soaps such as ricinoleates, polymercaptanes, etc.

A catalyst system and any compound or mixture of compounds which generate free radicals under the particular conditions of polymerization may be used.

These compounds are: the peroxides or the hydroperoxides, such as diacetyl peroxide, benzoyl peroxide, hydrogen peroxide, cumene hydroperoxide, methylethylketone peroxide, etc. Other catalysts which generate free radicals may also be used, such as e.g. ammonium persulphate, perborates and percarbonates.

In addition to the free radical generating catalyst it is preferred to employ also an accelerator which increases the speed of decomposition of the peroxidic compound, which thus produces free radicals at higher speeds. As an accelerator, cobalt naphthenate is generally employed, which is diluted with styrene until it is brought to a concentration of about 1–3% of metal. A complexing agent for increasing the efficiency of the accelerator may also be used.

According to a widely accepted interpretation, it is believed that these agents act to reduce the cobalt naphthenate which passes to the corresponding cobaltous compound which is much more reactive.

Generally aromatic tertiary amines, preferably dimethylaniline are used as complexing agents.

Broad variations and changes may be effected in carrying into practice the present invention, without departing from the spirit and the scope of the present invention.

In order better to illustrate the inventive idea of the present invention and to carry the same into practice, the following non-limitative example is described.

EXAMPLE 1

In a steel vessel, there are charged 100 kg of a polyester resin prepared in a reactor by mixing the following compounds according to the following molar ratios: propylene glycol 0.8 mols, diethylene glycol 0.2 mols, maleic anhydride 0.6 mols, phthalic anhydride 0.4 mols, hydroquinone 100 ppm, styrene 30% with respect to the resin. To the aforesaid resin are added 500 ml of cobalt octoate in xylene at a concentration of 6%, 1 kg of silicone oil, 15 kg of milled glass-fibers having a nominal length of 0.8 mm. The whole is mixed with an helical stirrer for about 20 minutes. The aforesaid mixture is transferred from the vessel, by using a gear pump having a flow rate of 200 l/h, into a turbine and thermostatized at 35° C. The aforesaid turbine is constituted by a stator and a rotor both provided with cylindrical projections.

The turbine, as indicated previously for turbine "A", has the following dimensions:
 free volume=14 liters
 length of stator=41.5 cm
 diameter of stator=31 cm
 length of the rotor=31.6 cm
 position of projections=in alternative rows on the stator and on the rotor
 foaming capacity=adjustable, between 100 and 800 l/h of mixture fed.

The peripheral speed of the rotor is 230 m/min. The foaming gas (air) having a flow rate of 360 Nl/h (normal lt/h)anf at a pressure of 2.5 absolute atmospheres, is injected into the turbine from a nozzle. Methylethylketoneperoxide is introduced with a flow rate of 2 l/h at the level of the last but one row of projections before the foam leaves the turbine.

The pressure existing in the turbine permits the foam to flow out with a flow rate of about 560 l/h in such a way that it may be poured into a mould at 35° C. Since the polymerization time is about 10 minutes, the foam solidifies. The following physical and mechanical characteristics are measured on samples obtained from the cellular material thus produced:
 density 0.45 kg/cm$^3$
 Tensile strength: 47 kg/cm$^2$
 Tensile modulus: 9780 kg/cm$^2$
 Elongation at break: 0.74%
 Compression strength
 at 7% deformation: 78 kg/cm$^2$
 shear strength: 27 kg/cm$^2$
 shear modulus: 623 kg/cm$^2$
 Minimum falling height of a steel ball weighing 5 kg which causes the breakage of a sample having a thickness of 1 cm: 120 cm

EXAMPLE 2

The same resin of Example 1 is used, containing the same additives in the same amounts and the same amounts of glass fibers having the same characteristics.

To this mixture 50 kg of calcium carbonate are added in powder form.

The whole is mixed by means of a helical stirrer for about 20 minutes. The aforesaid mixture is transferred from the vessel into the turbine of Example 1 by means of a gear pump and is thermostatized at 35° C. The peripheral speed of the rotor is 230 m/min.

From a nozzle nitrogen is injected into the turbine at a flow rate of 360 Nl/h (normal l/h) and a pressure of 2.5 absolute atmospheres. Methylethylketoneperoxide is introduced into the turbine with a flow rate of 2 lt/h at the level of the last but one row of projections before the foam leaves the turbine.

The pressure existing in the turbine permits the foam to flow out, with a flow rate of about 560 l/h and a density of about 0.7 kg/l. The foam, poured into a mold heated to 35° C., cross-links in about 10 minutes, whereby a solid cellular material having a density of about 0.8 kg/l is obtained. Its elastic modulus is 12500 kg/cm$^2$.

EXAMPLE 3 (Comparison example)

This example has the purpose of demonstrating the criticallity of the length of the glass fibers.

The same resin, additives and glass fibers mixture of Example 1 is used except that the glass fibers have a length of 35 mm (1.4") instead of 0.8 mm. In order to mix the ingredients the same vessel and helical stirrer of Example 1 are used.

The aforesaid mixture is fed, by means of the same gear pump of Example 1, again with a flow rate of 200 l/h into the turbine "A" of Example 1, thermostatized at 35° C., the peripheral speed of the rotor being 230 m/min.

From the nozzle air is injected into the turbine with a flow rate of 360 normal l/h and a pressure of 2.5 absolute atmospheres. Methylethylketone peroxide is added with a flow rate of 2 liters/hour at the last but one row of projections.

It is observed that the gear pump reduces rapidly its flow rate because of glass fibers deposition, while the turbine stops working after a few seconds due to occlusion.

Initially a resin containing a few gas bubbles and a few glass fibers, which is not foamed flows out of the turbine. Successively, however, only pure, not-foamed resin comes out.

The process of Example 3 is therefore not suitable for producing a foam reinforced with glass fibers.

EXAMPLE 4 (comparison example)

This example has the same purpose of Example 3.

Example 3 is repeated except that the glass fibers employed have an average length of 6.5 mm.

As in the case of Example 1, a reduction of the flow rate of the gear pump is observed because of the deposition of glass fibers, after a few minutes. From the turbine, initially, a foam flows out, having a density of about 1 kg/l and containing relatively few gas bubbles and only very few glass fibers. After a few minutes, the turbine becomes blocked because of occlusion due to the deposition of glass fibers and only resin comes out which is not foamed. The conclusions are the same as in Example 3.

EXAMPLE 5 (comparison example)

This example has the purpose of illustrating the results obtained using an unsaturated polyester resin reinforced with glass fibers, according to the present invention, but foamed by means of a gas dissolved in the resin (physical foaming) instead of by mechanical introduction of the gas.

The same resin and additives of Example 1 are used.

By means of a helical stirrer the following components are mixed:

10 kg of the resin of the resin of Example 1 containing the same additives (hydroquinone, cobalt octoate, silicone oil) of Example 1 and 1.5 kg of glass fibers having a nominal length of 0.8 mm.

The mixture is transferred to an autoclave and 86 cm$^3$ of methylethylketone peroxide are added to it. The autoclave is rapidly closed and, through a tube immersed into the mixture, gaseous carbon dioxide is introduced at a pressure of 5 atmospheres up to saturation. Under the constant pressure of 5 atmospheres, the mixture is ejected through a spinneret the orifices of which have a diameter of 0.3 mm. Because of the decompression occuring at the exit from the spinneret, the gas dissolved in the resin is liberated in the form of bubbles causing the mixture to foam. However, the orifices of the spinneret become very rapidly occluded with glass fibers and therefore the spinneret becomes blocked in less than one minute and the device causes to produce foam. The same phenomenous occurs again after having cleaned the orifices of the spinneret.

The method of physical foaming by dissolution of a gas is therefore enable to produce foams reinforced with glass fibers and is not suitable for a continuous industrial process.

EXAMPLE 6 (comparison example)

This example has the purpose of illustrating the results obtained by using an unsaturated polyester resin reinforced with glass fibers according to the present invention but foamed by means of a low boiling liquid dissolved in the resin (physical foaming).

The same resin and the same additives and glass fibers are used as in Example 5, except that these components are mixed at a temperature comprised between 10° and 15° C. in order to avoid any possible premature volatilization of the blowing agent.

To 10 kg of resin containing the additives specified in Example 1, 1.5 kg of glass fibers having a nominal length of 0.8 mm, 86 cm$^3$ of methylethylketone peroxide and 12.5 g of monofluorotrichloromethane (known as FREON 11) are added.

The mixture thus obtained is pumped into a closed mold having a thickness of 4 cm, provided with discharge holes and pre-heated to 50° C. The amount of mixture introduced into the mold corresponds to about 30% of the internal volume of the mold.

After a setting (hardening) time of 30 minutes at 50° C., the mold is opened and the article produced is extracted from it. The product has a density of 0.45 kg/lt.

Comparing the mechanical properties of this product to those of the product of example 1 it is observed that the tensile modulus of the product obtained in example 1 is 15–20% higher than the corresponding values of the product obtained according to example 6.

EXAMPLE 7 (Comparison of the properties of the cellular materials obtained according to the present invention to those obtained according to the prior art)

From the cellular materials obtained according to examples 1 and 6 specimen are cut along the thickness of the articles which is of 4 cm. These specimen are examined by means of an optical microscope at magnification 20.

The gas bubbles contained in the specimen obtained from the material obtained in Example 1 are observed to be homogeneously distributed throughout the thickness to five equal layers, it is noted that each layer containes 20±1% of the total amount of the bubbles contained in that thickness.

Examining in the same manner the specimen cut from the article obtained in Example 6 an unhomogeneous distribution of the gas bubbles is observed throughout the thickness of the article. By dividing graphically said thickness into five layers of equal thickness it is noted that the central layer contains from 30 to 40% of the total volume of the bubbles while the two external layers contain, each, less than 10% of the total volume of the bubbles.

Measuring, again by means of the optical microscope, the dimensions of the gas bubbles, it is found that, in the case of the specimen obtained from the material of Example 1, 75% of the gas bubbles have a diameter of between 0.1 and 0.3 mm, 15% of the bubbles have lower diameter and 10% have diameters higher than 0.3 mm.

The same measurement effected on the specimen of Example 6 shows a much less homogeneous distribution of the bubble dimensions. In this case only about 50% of the bubbles have diameters of beteen 0.1 and 0.3 mm while about 35% have lower and 15% have higher diameter.

These two types of nonhomogeneity will negatively influence the mechanical properties of the cellular material, as indicated in Example 6.

We claim:

1. Fiber-reinforced liquid foams suitable for transforming into solid reinforced cellular materials having a density lower than 0.7 kg/l if no inert fillers are present or a density lower than 1 kg/l if inert fillers are present as well, said liquid foam being produced by a process comprising (1) mixing together an unsaturated polyester resin, a reinforcing material and, optionally an inert filler, said reinforcing material being selected from the group consisting of synethetic fibers, vegetable fibers and mineral fibers having a maximum length of 3 mm, whereby a liquid mixture is obtained; (2) transferring said liquid mixture of reinforcing material, unsaturated polyester resin and, optionally, said inert filler to a turbine having a free internal volume of at least 2 liters and comprising a rotor and a stator, both having either prismatic or cylindrical projections, said turbine rotor having a peripheral speed of greater than 200 m/min.; (3) introducing a gas into said turbine at a pressure of from 1.1 to 10 absolute atmospheres, said turbine operating to distribute said gas in the form of small bubbles homogeneously and uniformly throughout said mixture, thereby producing a reinforced foam of unsaturated polyester resin; thereafter discharging said reinforced foam from said turbine.

2. A reinforced solid cellular material according to claim 1 wherein said reinforced foam is cross-linked.

3. A reinforced solid cellular material according to claim 2, wherein said cross-linking is effected in open molds or in continuous shaping devices.

* * * * *